United States Patent Office 3,036,091
Patented May 22, 1962

---

3,036,091
ADDITION PRODUCTS OF POLYFLUOROCYCLO-BUTANONES AND A DIENE
David C. England, Wilmington, Del., assignor to E. I. du Pont de Nemours and Company, Wilmington, Del., a corporation of Delaware
No Drawing. Filed Dec. 24, 1958, Ser. No. 782,616
16 Claims. (Cl. 260—345.1)

This invention relates to, and has as its principal objects provision of a new class of polyfluoroperhalocyclobutane-spiromonoethers and polyfluoroperhalocyclobutanedi-spirodiethers and a process for the preparation of the same.

Both acyclic and cyclic unsaturated ketones are well known as dienophiles in the Diels-Alder reaction—see, for instance, "Organic Reactions," vol. IV, chapters 1 and 2, and "Organic Reactions," vol. V, chapter 3, respectively, 1948 and 1949, John Wiley & Sons, New York, publishers. In these reactions the unsaturated acyclic ketones and the unsaturated cyclic ketones, or the so-called cyclenones, give no indication of participation of the ketone carbonyl double bond in the Diels-Alder reaction. Such substituents remain unchanged in the reaction, the unsaturated carbon-carbon linkage in the ketones being solely involved in the Diels-Alder reaction. Saturated ketones have not been reported as dienophiles in this reaction.

It has now surprisingly been discovered that the saturated polyfluoroperhalocyclobutanones and cyclobutane-1,2-diones are extremely reactive dienophiles with conjugated 1,3-dienes in the Diels-Alder reaction to form new and useful polyfluoroperhalocyclobutanemonospiromono-ethers, oxo - substituted polyfluoroperhalocyclobutane-monospiromonoethers, and polyfluoroperhalocyclobutane-dispirodiethers. The oxopolyfluoroperhalocyclobutane-monospiromonoethers can be readily and directly converted to the hydrates and hemiketals. By virtue of the peculiar nature of the polyfluoroperhalocyclobutane ring in a spiro structure and the unsaturation present in one or both of the spiro ether rings, these compounds are of generic utility for incorporation into alkyd resins as bodying agents. They also improve the stability of the finally-set alkyds in film form as conventionally applied in paints, and also the drying time and/or drying temperatures necessary for such modified alkyds.

These monospiromonoethers and dispirodiethers, and the oxo-substituted derivatives of the former and the hydrate and hemiketal derivatives thereof, can be illustrated by the following structural formulas:

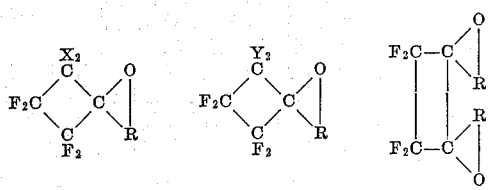

wherein the X's represent halogen, alike or different, of atomic number 9–35; the Y's, alike or different, represent hydroxy or hydrocarbyloxy, or together a single doubly bonded oxygen; and the bridging radicals R, again alike or different, which form with each indicated spiro carbon and accompanying ring oxygen a tetrahydrooxin ring are used to represent the divalent diradical resulting from the conventional shifting of the bonds in a wholly carbon chain 1,3-butadiene or substituted butadiene reactant occurring in the Diels-Alder reaction. Simply, these bridging diradicals can be characterized as the diene residue in a conventional Diels-Alder sense.

Because of the readier availability of the reactants and the markedly higher reactivity, the preferred compounds of the present invention can be represented by the following structural formulas:

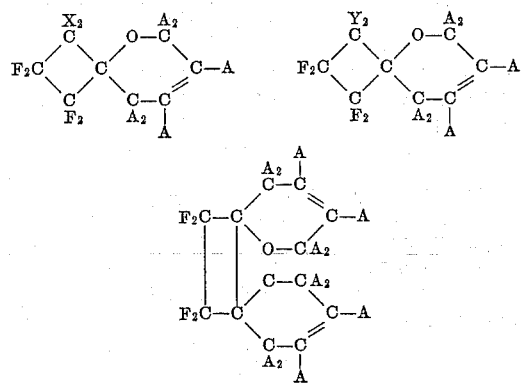

wherein the X's and Y's are as before, and the A's, which also can be alike or different, are monovalent radicals free of Zerewitinoff active hydrogen and of no more than eight carbons each, which can be together joined, in which instance they are wholly carbon chain. A still more preferred class of the polyfluoroperhalocyclobutanespiro-monoethers, polyfluoroperhalooxocyclobutanemonospiro-monoethers, and polyfluoroperhalocyclobutanedispirodi-ethers of the present invention are those represented by the following structural formulas:

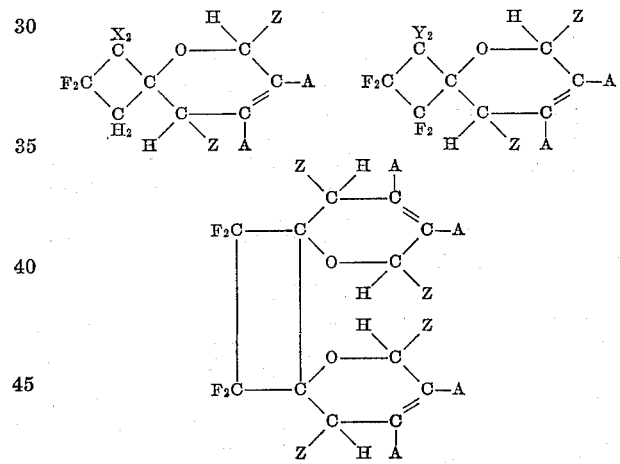

wherein the X's, Y's, and A's have their previous significance and the Z's are hydrogen, or taken pairwise in each ring a bridging saturated hydrocarbyl diradical. These most preferred products arise from 1,3-dienes and 2- and/or 3-mono and/or disubstituted 1,3-dienes wherein the terminal carbons of the butadiene skeleton each carry two hydrogens, i.e., are both methylenic carbons, or each carry one hydrogen and are together linked in a carbocyclic ring which contains the conjugated 1,3-diene structure.

These new polyfluoroperhalocyclobutanemonospiro-tetrahydrooxins, polyfluoroperhalooxocyclobutanespiro-tetrahydrooxins, and the hydrates and hemiketals thereof, and the polyfluoroperhalocyclobutanedispirobistetra-hydrooxins of this invention, and the preparation thereof from polyfluoroperhalocyclobutanones and polyfluoro-perhalocyclobutane-1,2-diones and 1,3-conjugated dienes, are illustrated in greater detail, but are not to be limited, by the following more specific examples in which the parts given are by weight unless otherwise indicated. These compounds have been named in accordance with accepted Chemical Abstracts indexing procedure—see also the I.U.P.A.C., Rule A–41 of the tentative rules for organic nomenclature reported on at Zurich, July 20–28, 1955.

EXAMPLE I

A thick-walled glass reactor, approximately 24 diameters long and of internal capacity corresponding to about 150 parts of water was evacuated, cooled in a liquid nitrogen bath, and charged with a mixture of 8.5 parts of perfluorocyclobutanone and six parts of butadiene (2.25 molar proportions based on the ketone). The glass reactor was sealed and the reactor and its contents exposed overnight to the radiation from a commercial 85 watt mercury vapor lamp with a glass envelope permitting transmission of no radiation of wave lengths below 2800 A. The reactor was cooled, opened, and at liquid nitrogen temperatures connected to a low-temperature still. Upon distillation there was thus recovered two parts (33%) of butadiene boiling at —5° C. The remaining liquid reaction mixture was filtered to remove about 0.2 part of white rubbery polymer, and the filtrate (8.5 parts) was purified by fractionation. There was thus obtained 7.9 parts (72.5% of theory) of 1,1,2,2,3,3-hexafluoro-5-oxaspiro[3.5]non-7-ene as a clear, colorless liquid boiling at 137° C. at atmospheric pressure; $n_D^{25}$, 1.3720. Infrared and nuclear magnetic resonance spectra were consistent with the hexafluorooxaspirononene structure.

*Analysis.*—Calcd. for $C_8H_6F_6O$: C, 41.1%; H, 2.6%; F, 49.1%. Found: C, 41.5%; H, 2.8%; F, 49.0%.

In essentially the same fashion, a reactor was charged with seven parts of perfluorocyclobutanone and seven parts (3.86 molar proportions based on the ketone) of butadiene. The sealed reactor and its contents were heated at 175° C. for twelve hours. After cooling the reactor, opening it, and removing the product by distillation, there was obtained 7.6 parts (83% of theory) of 1,1,2,2,3,3 - hexafluoro-5-oxaspiro[3.5]non-7-ene as a clear, colorless liquid boiling at 130–143° C. at atmospheric pressure. The broad boiling range is due to contamination with by-product vinylcyclohexene arising from dimerization of the butadiene.

Perfluorocyclobutanone, the starting material of this example, may be prepared as shown in Example I of my copending application S.N. 43,331, filed July 18, 1960, a continuation-in-part of my now-abandoned application S.N. 717,805.

EXAMPLE II

A glass reactor as in Example I was cooled in a liquid nitrogen bath, charged with six parts of freshly distilled cyclopentadiene, and sixteen parts (1.26 molar proportions based on the diene) of perfluorocyclobutanone. The reactor was sealed and allowed to warm to room temperature. The tube was then refrozen, opened, and the reaction mixture separated by distillation. There was thus obtained 20.5 parts (93% of theory) of 2-oxabicyclo[2.2.1]hept - 5 - ene - 3 - spiro - 1' - 2',2',3',3',4',4'-hexafluorocyclobutane, i.e., 1,1,2,2,3,3 - hexafluoro-6,9-methano-5-oxaspiro[3.5]non-7-ene, as a clear, colorless liquid boiling at 51° C. under a pressure corresponding to 10 mm. of mercury; $n_D^{25}$, 1.3865. Infrared and nuclear magnetic resonance spectra were consistent with the oxabicycloheptanespirohexafluorocyclobutane, or hexafluoromethanooxaspirononene, structure.

*Analysis.*—Calcd. for $C_9H_6F_6O$: C, 44.3%; H, 2.5%; F, 46.7%. Found: C, 44.1%; H, 2.7%; F, 46.5%.

EXAMPLE III

A glass reactor as in Example I was charged with a mixture of seven parts of perfluorocyclobutanone, eleven parts (about 3.0 molar proportions based on the ketone) of bicycloheptadiene, 0.5 part of phenothiazine inhibitor, and about 0.3 part of a commercially-available terpene stabilizer (see U.S. Patent 2,407,405) and sealed. Upon warming to room temperature, the reaction mixture was immiscible, but after being warmed overnight at steam bath temperatures, the reaction mixture was homogeneous. The reactor was cooled, opened, and the reaction mixture separated by distillation. There was recovered seven parts (63%) of bicycloheptadiene, but no perfluorocyclobutanone. Further distillation afforded 7.6 parts (72% of theory) of 2,2,3,3,4,4-hexafluoro-tetrahydrocyclobutanespiro[1,3'(3'aH) - 1',4',5' - metheno-1'H-cyclopenta(c)furan], i.e., 1,4,5-metheno-cyclopenta(c)tetrahydrofuran - 3 - spiro - 1' - 2',2',3',3',4',4'-hexafluorocyclobutane of the structure

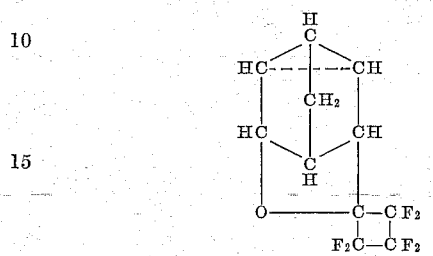

i.e.,

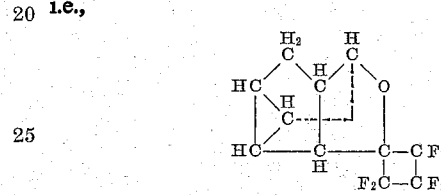

as a clear, colorless liquid boiling at 88° C. under a pressure corresponding to 18 mm. of mercury; $n_D^{25}$, 1.4901. The nuclear magnetic resonance and infrared spectra were consistent with the oxahexafluoronortricyclene structure.

*Analysis.*—Calcd. for $C_{11}H_8OF_6$: C, 48.9%; H, 3.0%; F, 42.2%. Found: C, 49.5%; H, 3.2%; F, 41.1%.

EXAMPLE IV

A glass reactor was charged as in Example I with 45 parts of perfluorocyclobutanone while the reactor was in a liquid nitrogen bath. There was then added rapidly 17 parts (an equimolar proportion based on the ketone) of ice-cold (about 5–10° C.) isoprene. Reaction occurred immediately, the heat of reaction being sufficient to liquify the contents of the reactor even though it was cooled in liquid nitrogen. The reactor was then sealed and heated at steam bath temperatures for one hour. No refluxing occurred, indicating that the reaction was completed during the rapid exothermic reaction occurring when the isoprene was charged. The reactor was cooled, opened, and the reaction mixture purified by distillation. There was thus obtained 50 parts (80.5% of theory) of mixed 1,1,2,2,3,3-hexafluoro-(7 and 8)-methyl-5-oxaspiro[3.5]non-7-enes as a clear, colorless liquid boiling at 95° C. under a pressure corresponding to 100 mm. of mercury. The atmospheric boiling point of the material is 153° C.

*Analysis.*—Calcd. for $C_9H_8F_6O$: C, 43.9%; H, 3.3%; F, 46.3%. Found: C, 44.2%; H, 3.5%; F, 46.3%.

The formula for the products of this example may be conventionally written as

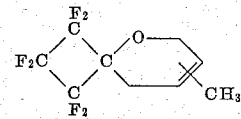

EXAMPLE V

A glass reactor was charged as in Example I with nine parts of 2-bromo-2,3,3,4,4-pentafluorocyclobutanone and three parts (an essentially equimolar proportion based on the ketone) of 2,3-dimethylbutadiene. The reactor was sealed, the liquid nitrogen bath removed, and the reactor allowed to warm slowly to room temperature. An exothermic reaction occurred which was kept under control with an external ice-water cooling bath. The cooling bath was removed after the reaction had subsided, and the reaction mixture was then heated at the reflux for about one hour. The reactor was cooled, opened, and the reaction mixture purified by distillation. There was thus obtained 8.8 parts (73% of theory) of 1-bromo-1,2,2,3,3-pentafluoro-7,8-dimethyl-5-oxaspiro[3.5]non-7-ene as a clear, colorless liquid boiling at 80–81° C. under a pressure corresponding to eight mm. of mercury. The infrared spectrum was consistent with the bromopentafluorodimethyloxaspirononene structure.

*Analysis.*—Calcd. for $C_{10}H_{10}BrF_5O$: C, 37.4%; H, 3.2%. Found: C, 37.6%; H, 3.2%.

The 2-bromo-2,3,3,4,4-pentafluorocyclobutanone used as a starting material in this example may be prepared by the procedure of Example VII of my copending application S.N. 43,331, as follows:

A. *Preparation of 2-Bromo-1,2,3,3,4,4-Hexafluoro-1-Methoxycyclobutane*

A stainless steel high-pressure reaction vessel of an internal capacity corresponding to 500 parts of water was charged with a mixture of 161 parts of bromotrifluoroethylene, 112 parts of methyl trifluorovinyl ether, one part of phenothiazine inhibitor, and about 0.3 part of a commercially available terpene stabilizer (see U.S. Patent 2,407,405). The reactor was sealed and heated at 175° C. for twelve hours. The reactor was then cooled to room temperature, vented to the atmosphere, and the reaction mixture separated by distillation. There was thus obtained 143 parts (52% of theory) of 2-bromo-1,2,3,3,4,4-hexafluoro-1-methoxycyclobutane as a clear, colorless liquid boiling at 101–110° C. contaminated with a small amount of unreacted bromotrifluoroethylene (B.P. 94° C.). The infrared spectrum was wholly consistent with the bromohexafluoromethoxycyclobutane structure.

*Analysis.*—Calcd. for $C_5H_3BrF_6O$: C, 26.4%; H, 1.1%. Found: C, 25.9%; H, 1.6%.

B. *Preparation of 2-Bromo-2,3,3,4,4-Pentafluorocyclobutanone*

A pressure-resistant reaction vessel fabricated from a commercially available alloy of nickel, iron, and molybdenum and of internal capacity corresponding to 500 parts of water was charged with a mixture of 143 parts of the above 2-bromo-1,2,3,3,4,4-hexafluoro-1-methoxycyclobutane, about 400 parts of sulfuric acid, and 12 parts of water. The reactor was closed and heated at 125° C. for twelve hours. The reactor and its contents were then cooled in a solid carbon dioxide/acetone bath. The reactor was opened and 500 parts of phosphorus pentoxide was added and the product removed by distillation. There was thus obtained 53 parts (42% of theory) of 2-bromo-2,3,3,4,4-pentafluorocyclobutanone as a clear, colorless liquid boiling at 52.0–54.5° C. at atmospheric pressure. The infrared and nuclear magnetic resonance spectra were wholly consistent with the bromopentafluorocyclobutanone structure.

*Analysis.*—Calcd. for $C_4BrF_5O$: C, 20.1%; F, 39.8%. Found: C, 20.4%; F, 40.4%.

EXAMPLE VI

A glass reactor, protected from atmospheric moisture with drying tubes, was externally cooled with an ice-water bath and charged with 10.6 parts of 2,2-dichloro-3,3,4,4-tetrafluorocyclobutanone and 4.1 parts (an equimolar proportion based on the ketone) of 2,3-dimethylbutadiene was added at such a rate as to keep the exothermic reaction under control through use of the external cooling bath. When the addition of the dimethylbutadiene had been completed, the cooling bath was removed and the reaction mixture was then allowed to stand overnight at room temperature. Upon distillation there was thus obtained 4.2 parts (29% of theory) of 1,1-dichloro-2,2,3,3-tetrafluoro-7,8-dimethyl-5-oxaspiro[3.5]non-7-ene as a clear, colorless liquid boiling at 85.0–87.5° C. under a pressure corresponding to seven mm. of mercury. The infrared spectrum was consistent with the dichlorotetrafluorodimethyloxaspirononene structure.

*Analysis.*—Calcd. for $C_{10}H_{10}Cl_2F_4O$: C, 41.0%; H, 3.4%. Found: C, 41.7%; H, 3.6%.

2,2-dichloro-3,3,4,4-tetrafluorocyclobutanone may be prepared in accordance with Example VI of my copending application S.N. 43,331.

EXAMPLE VII

To a solution of 10.6 parts of perfluorocyclobutane-1,2-dione in about 15 parts of anhydrous diethyl ether in a glass reactor attached to a glass vacuum manifold system and externally cooled with a solid carbon dioxide/acetone bath there was added by distillation from a calibrated cold trap 4.8 parts (1.3 molar proportions based on the dione) of butadiene. Nitrogen was bled into the vacuum system and the cooling bath was removed from the glass reactor containing the reaction mixture. On warming to about 0° C., the ethereal solution suddenly changed from green to almost colorless. The reaction mixture was allowed to continue to warm to room temperature and stirred under those conditions for about one-half hour, during which time excess butadiene was permitted to boil off through an open end manometer. The ethereal solution was quickly transferred to a rotating evaporator and the diethyl ether solvent and any unreacted diketone or diene reactant evaporated under a high vacuum at room temperature. The resulting residual oil was distilled through a precision fractionation column. There was thus obtained 12 parts (85% of theory) of 2,2,3,3-tetrafluoro-5-oxaspiro[3.5]-non-7-en-1-one as a light yellow liquid boiling at 67° C. under a pressure corresponding to 28 mm. of mercury. The material exhibited an infrared spectrum fully consistent with the tetrafluorooxaspirononenone structure, exhibiting a characteristic absorption for the carbonyl group at 5.45 microns, a carbon-carbon double bond at 6.0 microns, and vinylene carbon-hydrogen bonds at 3.25 microns.

*Analysis.*—Calcd. for $C_8H_6F_4O_2$: C, 46.8%; H, 2.9%; F, 36.2%. Found: C, 46.2%; H, 3.2%; F, 36.6%.

While this compound, in view of the precedence to be given in naming to the ketone function, has been named as above as a nonenone, it can also be named to stress the similarity to the previously described oxaspirononenes in that fashion treating the ketone function as a substituent to the ring structure, i.e., as 2,2,3,3-tetrafluoro-1-oxo-5-oxaspiro[3.5]non-7-ene.

Perfluorocyclobutane-1,2-dione can be prepared in accordance with Example I of my copending application S.N. 29,188, filed May 16, 1960, a continuation-in-part of my now-abandoned application 731,606.

EXAMPLE VIII

To one part by volume of the above 2,2,3,3-tetrafluoro-5-oxaspiro[3.5]non-7-en-1-one in a glass reactor protected from atmospheric moisture was added one-quarter part by volume of water. When the exothermic reaction had subsided, the reaction mixture had solidified. The white crystalline material was recrystallized from a 3:1 by volume mixture of cyclohexane and benzene and then from cyclohexane alone to afford 1.3 parts of 2,2,3,3-tetrafluoro-1,1-dihydroxy-5-oxaspiro[3.5]non-7-ene as white needles melting at 74–77° C.

*Analysis.*—Calcd. for $C_8H_8F_4O_3$: C, 42.2%; H, 3.5%; F, 33.2%. Found: C, 42.3%; H, 3.8%; F, 33.3%.

EXAMPLE IX

To about 3.0 parts of perfluorocyclobutane-1,2-dione in a thick-walled, cylindrical, glass reactor of internal capacity corresponding to 25 parts of water, cooled with an external solid carbon dioxide/acetone bath, was cautiously added 4.2 parts (2.5 molar proportions based on the dione) of 2,3-dimethylbutadiene. After the initial reaction had subsided, as evidenced by disappearance of the blue color of the dione, the glass reactor was sealed and heated at 70° C. for 20 minutes. The reactor was allowed to cool and then opened. In addition to a considerable amount of polyoxy(2-oxo-3,3,4,4-tetrafluorocyclobutylidene) there was also obtained about 0.3 part of 13,13,14,14 - tetrafluoro - 3,4,10,11 - tetramethyl - 1,8-dioxadispiro[5.0.5.2]tetradeca-3,10-diene as white crystals which, after two recrystallizations from cyclohexane, exhibited a melting point of 145° C. The infrared absorption spectrum was consistent with the tetrafluorotetramethyldioxadispirotetradecadiene structure.

*Analysis.*—Calcd. for $C_{16}H_{20}F_4O_2$: C, 60.0%; H, 6.3%; F, 23.8%. Found: C, 60.0%; H, 6.3%; F, 22.7%.

The product can also be named as 3,4-dimethyl-1,2,5,6-tetrahydrooxin - 6 - spiro - 1' - 2',2',3',3', - tetrafluorocyclobutane - 4' - spiro - 1'' - 1'', 2'',5'',6'' - tetrahydrooxin or 5,6-dihydro-3,4-dimethyl-2H-pyran-6-spiro-1'-2', 2',3',3' - tetrafluorocyclobutane - 4' - spiro - 1'' - 5'',6''-dihydro-3'',4''-dimethyl-2''H-pyran.

This invention is generic to polyfluoroperhalocyclobutanemonospirotetrahydrooxins, oxopolyfluoroperhalomonospirocyclobutanetetrahydrooxins and the hydrate and hemiketal derivatives thereof, and polyfluoroperhalodispirocyclobutanebis(tetrahydrooxins) wherein in each instance the hetero oxygen atom of the tetrahydrooxin or 5,6-dihydro-2H-pyran rings is immediately adjacent to the spiro carbon of both the four- and six-membered rings and the single double bond in each of the six-membered oxygen-containing rings is in the 3-position of such ring, i.e., is between the carbons of the six-membered monooxygen-containing ring in the $\beta$- and $\gamma$-positions with respect to the hetero oxygen atom. As is evident from the descriptive names, the only substituents permitted on the carbons of the cyclobutane ring are halogen or, and solely on the 2-carbon of this ring, a single oxo substituent or two hydroxyl substituents, i.e., the hydrate form of the oxo compound, or one hydroxyl substituent and one hydrocarbyloxy substituent, i.e., the hemiketal form of the oxo compound with a monovalent hydrocarbyl alcohol. The cyclobutane ring carbons must carry a plurality of fluorine atoms, preferably a minimum of four per each cyclobutane ring. The other halogen substituents permitted on this ring have an atomic number from 9 to 35, inclusive, i.e., can be fluorine, chlorine, or bromine, alike or different. Because of readier availability of the necessary intermediates, the preferred halogen substituents other than fluorine are one chlorine, two chlorines, or one bromine.

As to possible substituents in the one to two spirotetrahydrooxin or 5,6-dihydro-2H-pyran rings, there can be no substituents on the ring oxygen. There can likewise be no substituents on the spiro carbon atom since all the valences of this carbon atom are taken care of in forming the two spiro rings. While formally from one to two substituents can be present on the ring carbon of the tetrahydrooxin rings immediately next to the hetero oxygen atom, and also on the ring carbon immediately adjacent to the spiro carbon, both these carbon atoms will generally be at most monosubstituted, i.e., will each carry two hydrogen atoms or one hydrogen atom and up to one substituent which, if present, will be monovalent and free of Zerewitinoff-active hydrogen such as halogen, for instance, fluorine, chlorine, or bromine; cyano; hydrocarbyl, for instance, alkyl, aryl, alkaryl, aralkyl, or cycloalkyl, generally of no more than eight carbons each; hydrocarbyloxy such as alkoxy, aryloxy, aralkoxy, alkaryloxy, or cycloalkoxy, again generally of no more than eight carbon atoms; and the like, all free of nonaromatic unsaturation, i.e., all aliphatically saturated. These ring carbons of the tetrahydrooxin rings immediately adjacent the hetero oxygen and the spiro carbon can also be together joined through one or more carbons to form still a third ring structure. The two ring carbons of the tetrahydrooxin rings carrying the ring double bond can each carry one hydrogen or one of the monovalent substituents just described.

The present invention is likewise generic to the preparation of these polyfluoroperhalocyclobutanemonospirotetrahydrooxins, polyfluoroperhalooxocyclobutanemonospirotetrahydrooxins and hydrates and hemiketals thereof, and polyfluoroperhalocyclobutanedispirobis(tetrahydrooxins) by the direct cycloaddition reaction between, respectively, one molar proportion of the requisite 2,2-dihalo-3,3,4,4-tetrafluorocyclobutanone and the requisite 1,3-diene, one molar proportion of the requisite polyfluoroperhalocyclobutane-1,2-dione and one molar proportion of the requisite 1,3-diene followed by hydration or hydrocarbyloxylation to form the respective hydrate and hemiketal derivatives, and one molar proportion of the requisite polyfluoroperhalocyclobutane-1,2-dione and two molar proportions of the requisite 1,3-diene or 1,3-dienes. The oxygen of the polyfluoroperhalocyclobutanone becomes the ring oxygen of the tetrahydrooxin ring, and the remaining ring carbons of this ring in the case of the 1:1 monoketone/diene adduct are furnished by the diene residue, i.e., the four chain carbons of the conjugated 1,3-diene.

This diene residue arises from the well-known Diels-Alder type addition with subsequent bond rearrangement. Thus, the two carbon-carbon double bonds in the 1,3-positions during the reaction break and a valence bond from each of the 1- and 4-carbons adds across and with the ketone carbonyl bond to form the tetrahydrooxin ring and the remaining two valence bonds from the broken carbon-carbon double bonds in the 1,3-diene structure move inwardly toward each other to form the second bond of the carbon-carbon double bond between the 2- and 3-carbons of the diene residue. Accordingly, the oxygen-containing six-membered ring carries one carbon-carbon unsaturation between the 3- and 4-carbons of that ring.

In the case of the 1:1 polyfluoroperhalocyclobutane-1,2-dione/diene adducts, one of the carbonyl carbons of the butanedione reacts similarly. The other ring carbonyl of the butanedione remains unreacted and, accordingly, forms the oxo substituent on the polyfluoroperhalocyclobutane ring. The diene residue, as just explained in the case of the monoketones, adds across and with the other cyclobutanedione carbonyl to form, similarly, a tetrahydrooxin ring.

In the case of the 1:2 adducts between the polyfluoroperhalocyclobutanedione and the 1,3-conjugated diene co-reactants, both the ring carbonyls of the cyclobutanedione are added across separately by and with the two diene residues, as just described, to form the two separate spirotetrahydrooxin rings. Thus, in all instances, the four carbons of the tetrahydrooxin rings forming with the carbonyl carbon and the carbonyl oxygen, the said tetrahydrooxin ring structure, are those of the parent carbon chain of the conjugated 1,3-diene reactant and, accordingly, will carry the respective substituents that these carbons carry, if any, in the diene form. Preferably such substituents will be present only on the 2- and 3-carbons of the diene reactant and, accordingly, will be present on the doubly bonded ring carbons of the tetrahydrooxin ring structures. These processes and products of the present invention are illustrated schematically in the following equations wherein the X's, A's, and R's have their previously established significance:

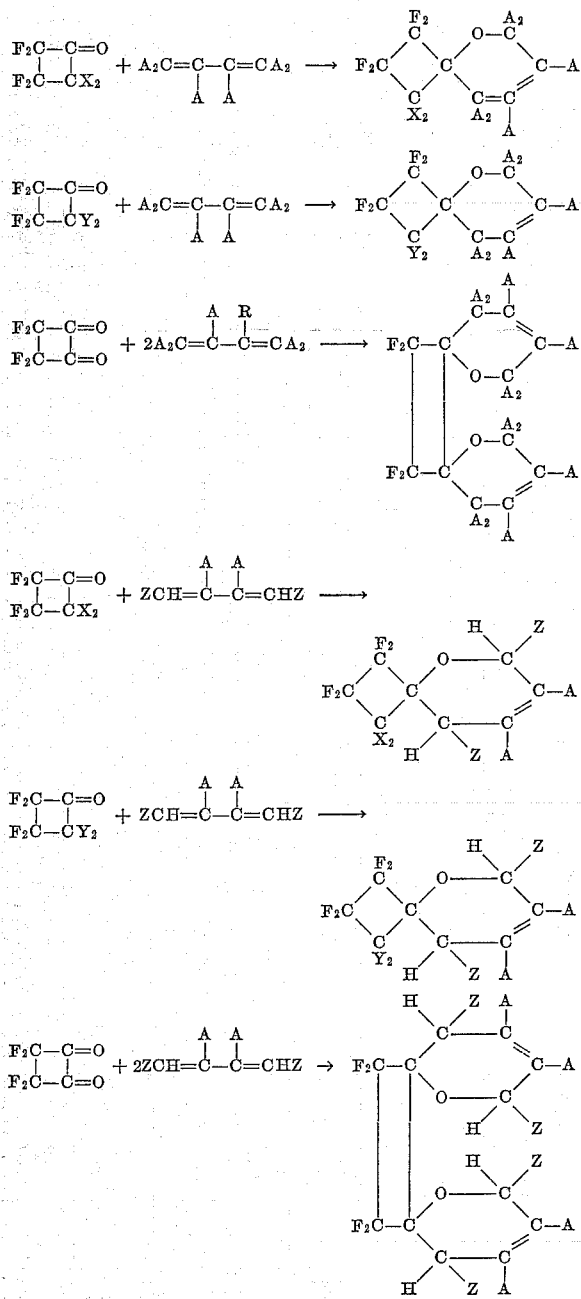

The reaction is a simple one and requires no complicated operating procedures or equipment. Generally the reaction is carried out in sealed reactors, of which the most convenient are glass or glass-lined reactors. Because of the relatively low boiling nature of some of the 2,2-dihalo-3,3,4,4-tetrafluorocyclobutanones and especially the polyfluoroperhalocyclobutane-1,2-diones and likewise because of the extreme chemical reactivity of these compounds, e.g., with, for instance, water, and especially with the present diene coreactants, the reaction will generally be carried out by cooling the reactor to liquid nitrogen temperatures or at least to those of solid carbon dioxide (about −80° C.), charging the particular 2,2-dihalo-3,3,4,4-tetrafluorocyclobutanone or polyfluoroperhalocyclobutane-1,2-dione involved as well as the diene coreactant, purging the reaction vessel with nitrogen, sealing, and allowing the reactor to warm slowly to room temperature. With the higher boiling ketones sealed systems are not normally used. The reaction will simply be carried out at the reflux under anhydrous conditions.

The cycloaddition reaction is effected thermally. Depending on the relative reactivity of the cyclobutanones and 1,3-dienes, the necessary reaction temperatures and reaction times will vary. For instance, with perfluorocyclobutanone and isoprene, the reaction is spontaneous and highly exothermic and goes spontaneously to completion even when cooled to liquid nitrogen temperatures. While this is an extreme case, generally the reaction will be exothermic and appropriate care should be taken in charging the reactants.

Normally after the exothermic reaction has subsided, temperatures no higher than 75–80° C. will usually be all that might be needed to finish off the reaction. Reaction times will vary from a few minutes to a few hours. In the case of the less reactive systems, primarily as a function of the reactivity of any substituted or hindered 1,3-dienes since apparently all of the polyfluoroperhalocyclobutanones and polyfluoroperhalocyclobutane-1,2-diones are quite reactive as dienophiles, higher temperatures and longer reaction times can be used. Temperatures higher than in the range 100–150° C. will normally not be required. Under these conditions even with the less reactive 1,3-dienes, reaction times required will be only a few hours. In those instances wherein the reaction is carried out in a sealed reactor, the reaction will, of course, be affected at elevated pressures. No externally applied pressure is required. The simple autogenous pressure of the reactants under the temperature conditions used will suffice.

The reaction mixtures are worked up quite simply to obtain the polyfluoroperhalocyclobutanemonospirotetrahydrooxins, polyfluoroperhalooxospirocyclobutanetetrahydrooxins and the hydrates and hemiketals thereof, and the polyfluoroperhalodispirocyclobutanebis(tetrahydrooxins). Thus, at the completion of the reaction it is only necessary to open the reactor to the atmosphere, distill away any unreacted dihalotetrafluorocyclobutanone or polyfluoroperhalocyclobutane-1,2-dione or 1,3-diene coreactant, and isolate and purify the desired products, normally by distillation.

The majority of the products are liquids, the hydrate and the methyl hemiketal of the oxopolyfluoroperhalo spirocyclobutanetetrahydrooxin, as well as the polyfluoroperhalocyclobutanedispirobis(tetrahydrooxins) being solids. The boiling point of the liquid products and the melting point of the solid products vary as is usual with increasing molecular weight of the overall compounds. As the molecular weight of the halogen substituents on the cyclobutane ring and/or the molecular weight of any substituents present in one or both, as the case may be, of the tetrahydrooxin rings increase, the boiling point of the liquids will increase and the melting point of the solids will increase. With the highest molecular weight halogen substituents in the cyclobutane ring at their maximum possible molecular weight and with the substituents in the tetrahydrooxin ring at their greatest length, i.e., no more than about eight carbons each, the products, including even the polyfluoroperhalomonospirocyclobutanetetrahydrooxins and the corresponding oxo-substituted compounds, will be solid. The solid products will be removed by filtration and, where necessary, can be purified by conventional recrystallization techniques, using such solvents as the aromatic hydrocarbons, e.g., benzene, toluene; the cycloaliphatic hydrocarbons such as cyclohexane, the methylcyclohexanes; and the like. Mixtures of these conventional solvents can also be used.

The reaction can be effected properly in the presence or absence of an inert organic reaction medium, which, if present, should be anhydrous. Any inert liquid organic diluent can be used and, generally speaking, the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite 2,2-dihalo-3,3,4,4-tetrafluorocyclobutanone or polyfluoroperhalocyclobutane-1,2-dione coreactants are simply mixed as described previously and the product isolated therefrom by distillation, and crystallization where necessary, after the reaction has been completed. The absence of a diluent generally makes separation of unreacted material and the desired products easier.

From the foregoing it is apparent that, in preparing these new polyfluoromonospirodihydropyrans and polyfluorodispirobis(dihydropyrans), there can be used any 2,2-dihalo-3,3,4,4-tetrafluorocyclobutanone wherein the two halogen substituents are of atomic number from 9 to 35, inclusive, i.e., fluorine, chlorine, and bromine, alike or different. More specifically, there can be used perfluorocyclobutanone, 2-chloro-2,3,3,4,4-pentafluorocyclobutanone, 2-bromo-2,3,3,4,4-pentafluorocyclobutanone, 2-bromo-2-chloro-3,3,4,4-tetrafluorocyclobutanone, 2,2-dichloro-3,3,4,4-tetrafluorocyclobutanone, and 2,2-dibromo-3,3,4,4-tetrafluorocyclobutanone.

Of these polyfluorocyclobutanones, the various chlorofluorocyclobutanones have been disclosed in U.S. Patents 2,712,554 and -5, although no detailed method for the preparation thereof is given. Perfluorocyclobutanone is a new compound per se and is being claimed in my copending application S.N. 757,701, filed August 28, 1958, a continuation-in-part of my now abandoned application S.N. 717,805, filed February 27, 1958. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy-1,3,3,4,4-pentafluoro-2,2-dihalocyclobutanes, all as disclosed and claimed in detail in the above-referred to copending application S.N. 43,331. These cyclobutanones are generically gaseous to liquid, depending on the total molecular weight which varies with the halogens, quite reactive materials which should preferably be handled under anhydrous conditions.

As the polyfluorinated four-member cyclic ketone coreactants there can also be used a polyfluoroperhalocyclobutane-1,2-dione, for instance, tetrafluorocyclobutane-1,2-dione. These new polyfluorocyclobutane-1,2-diones are new compounds per se and are shown in my copending application S.N. 29,188, a continuation-in-part of my now-abondoned application S.N. 731,606, filed April 29, 1958. These polyfluoroperhalocyclobutane-1,2-diones can be readily prepared by cyclo-addition between the requisite two polyfluoroperhalovinyl hydrocarbyl ethers, followed by hydrolysis under strong acid conditions of the resultant cyclic dimer, all as disclosed and claimed in detail in my above-referred to copending application. These polyfluoroperhalocyclobutane-1,2-diones are generically gaseous to liquid, depending on the total molecular weight which varies with the halogens, quite reactive materials which should preferably be handled under anhydrous conditions.

As the cycloaddition coreactants with the just-described polyfluoroperhalocyclobutanones and polyfluoroperhalocyclobutane-1,2-diones to make the new polyfluorooxospiromonoethers and dioxodispirodiethers of the present invention, there can be used any 1,3-conjugated diene, i.e., a compound having a wholly carbon chain of at least four carbons in which there are two ethylenic carbon-carbon double bonds in a 1,3-, i.e., $\alpha,\gamma$-, position relationship to each other, which is free of Zerewitinoff-active hydrogen and which, preferably, other than the two carbon-carbon double bonds of the conjugated 1,3-diene structure, is free of aliphatic unsaturation, i.e., is otherwise aliphatically saturated. Non-reactive substituents are permitted which are (a) free of Zerewitinoff active hydrogen and (b) nonreactive with active oxocarbonyl functions. Suitable illustrations of this type of permitted substituent include halogens, preferably of atomic number from 17 to 35, bonded to carbon, hydrocarbyloxy substituents, hydrocarbon substituents, tertiary amino substituents, nitrile, thiocyanato, and the like. Broadly speaking, these conjugated 1,3-diene coreactants can simply be regarded as those known as useful diene components in the well-known Diels-Alder reaction.

The most useful diene components can be characterized as acyclic conjugated 1,3-dienes and alicyclic conjugated 1,3-dienes, the latter being inclusive specifically of wholly alicyclic dienes, such as cyclopentadiene and bicyclic 1,3-conjugated dienes, such as bicyclohexenyl. For reasons of both readier availability and greater efficiency in the cycloaddition reaction with the polyfluoroperhalocyclobutanones and cyclobutane-1,2-diones, the preferred conjugated 1,3-diene coreactants are solely hydrocarbon or halo-substituted hydrocarbon which are free of Zerewitinoff-active hydrogen functions and, other than the two carbon-carbon double bonds of the required 1,3-conjugated system, are free of aliphatic unsaturation, i.e., are aliphatically saturated, and of no more than about twelve carbons exclusive of the requisite 1,3-conjugated system, i.e., comprise generally a total of no more than 16 carbons. Generically thus, the conjugated 1,3-diene coreactants are inclusive of both cyclic and acyclic dienes, including alkyl, aryl, aralkyl, alkaryl, and cycloalkyl dienes, and in particular the butadienes, including those carrying the permitted nonreactive substituents.

Suitable specific illustrations of useful conjugated 1,3-diene coreactants within the broad genus just defined include: acyclic 1,3-dienes, such as 1,3-pentadiene, 2,4-hexadiene; halogen-substituted 1,3-dienes, such as 2-chlorobutadiene; nitrile-substituted 1,3-dienes, such as 2-cyanobutadiene; aryl-substituted acyclic 1,3-dienes, such as 2,3-diphenyl-1,3-butadiene; alkoxy-substituted acyclic 1,3-dienes, such as 2,3-diethoxy-1,3-butadiene; alkoxyaryl-substituted acyclic dienes, such as 1-(3',4'-dimethoxyphenyl)-1,3-butadiene; tertiary amino-substituted acyclic dienes, such as 1-diethylamino-1,3-butadiene; alicyclic butadienes, such as cyclohexadiene; thiocyanato-substituted alicyclic dienes, such as 2-thiocyanato-1,3-butadiene; halogen-substituted alicyclic dienes, such as perchlorocyclopentadiene; and the like.

Mixtures of the polyfluoroperhalocyclobutanones or polyfluoroperhalocyclobutane-1,2-diones as well as the requisite 1,3-diene reactants can be used and, in fact, are necessary for the latter in the case of the ½ polyfluoroperhalocyclobutane-1,2-dione/1,3-diene adducts where different dihydropyran rings are desired, but as is usually the case when mixtures of the various coreactants are used, mixtures of closely related products which are inherently difficult to separate are obtained. Thus, in those instances where perfluorocyclobutanedispirobis(dihydro-2H-pyrans) are desired wherein the dihydropyran rings carry different substituents and in which, accordingly, necessarily a mixture of two 1,3-diene coreactants must be used, there will also be obtained polyfluorocyclobutanedispirodiethers wherein both the dihydropyran rings are those from only one of the dienes, and also dispirodiethers wherein both dihydropyran rings arise from the other diene coreactant.

Using the cycloaddition reaction conditions outlined in the foregoing, there will be obtained from the specific polyfluoroperhalocyclobutanones and polyfluoroperhalocyclobutane-1,2-diones and the conjugated 1,3-diene coreactants just discussed generically and illustrated with suitable specific examples additional polyfluorooxospiro-spiromonoethers and polyfluorodioxospirodiethers of the present invention. More specifically, from perfluorocyclobutanone and 1,3-pentadiene there is obtained 1,1,2,2,3,3 - hexafluoro - 6 - methyl - 5 - oxaspiro[3.5]-non - 7 - ene. From perfluorocyclobutanone and 2,4-hexadiene there is obtained 1,1,2,2,3,3-hexafluoro-6,9-dimethyl-5-oxaspiro[3.5]non-7-ene. From 2-bromo-2,3,3,4,4 - pentafluorocyclobutanone and 2 - chlorobutadiene there is obtained 1-bromo-(7,8)-chloro-1,2,2,3,3-pentafluoro-5-oxaspiro[3.5]non-7-ene. From 2-bromo-2,3,3,4,4-pentafluorocyclobutanone and 2-cyanobutadiene there is obtained 1-bromo-(7,8)-cyano-1,2,2,3,3-pentafluoro-5-oxaspiro[3.5]non - 7 - ene. From 2 - chloro - 2,3,3,4,4-pentafluorocyclobutanone and 2,3-diphenyl-1,3-butadiene there is obtained 1 - chloro - 1,2,2,3,3 - pentafluoro - 7,8-diphenyl-5-oxaspiro[3.5]non-7-ene. From 2-chloro-2,3,3,4,4-pentafluorocyclobutanone and 1-(3',4'-dimethoxyphenyl)-1,3-butadiene there is obtained 1-chloro-1,2,2,3,3 - pentafluoro - 6 - (3',4' - dimethoxyphenyl) - 5-oxaspiro[3.5]non - 7 - ene. From 2,2 - dibromo - 3,3,4,4-tetrafluorocyclobutanone and 2,3-diethoxy-1,3-butadiene there is obtained 1,1-dibromo-7,8-diethoxy-2,2,3,3-tetrafluoro-5-oxaspiro[3.5]non-7-ene. From 2,2-dichloro-3,3,4,4-tetrafluorocyclobutanone and 1-diethylamino-1,3-butadiene there is obtained 6-diethylamino-1,1-dichloro-2,2,3,3 - tetrafluoro - 5 - oxaspiro[3.5]non - 7 - ene. From 2-bromo - 2 - chloro - 3,3,4,4 - tetrafluorocyclobutanone and 1,3-cyclohexadiene there is obtained 1-bromo-1-chloro - 2,2,3,3 - tetrafluoro - 6,9 - ethano - 5 - oxaspiro-[3.5]non-7-ene. From tetrafluorocyclobutane-1,2-dione and 1-thiocyanato-1,3-butadiene there is obtained 2,2,3,3-tetrafluoro - 1 - oxo - 6 - thiocyanato - 5 - oxaspiro[3.5]-non-7-ene. From perfluorocyclobutane-1,2-dione and two molar proportions of perchlorocyclopentadiene there is obtained 2,3,4,5,9,10,11,12 - octachloro - 13,13,14,14-tetrafluoro - (3,6) - (9,10) - bis(dichloromethano) - 1,8-dioxadispiro[5.0.5.2]tetradeca-3,10-diene.

The monospiromonoethers of this invention and their oxo-substituted derivatives are generically useful as solvents, particularly for the addition polymers of ethylenically-unsaturated monomers, and more particularly as solvents for the polymers inclusive of copolymers of the ethylenically unsaturated esters, especially the ethylenically-unsaturated esters of carboxylic acids. More specifically, the dihalotetrafluorooxaspirononenes of the present invention are generically useful as solvents for polyvinyl acetate as illustrative of the broad class of addition polymers of the ethylenically-unsaturated esters of carboxylic acids.

Thus, samples of a commercially available polyvinyl acetate film were dissolved separately in the 1,1,2,2,3,3-hexafluoro - 5 - oxaspiro[3.5]non - 7 - ene of Example I, the mixed 1,1,2,2,3,3-hexafluoro-7- and -8-methyl-5-oxaspiro[3.5]non-7-enes of Example IV, the 1-bromo-1,2,2,3,3 - pentafluoro - 7,8 - dimethyl - 5 - oxaspiro-[3.5]non-7-ene of Example V, and the 1,1-dichloro-2,2,3,3 - tetrafluoro - 7,8 - dimethyl - 5 - oxaspiro[3.5]non-7-ene of Example VI. Concentrations of the solutions ranged from 1 to about 10%. Dissolution of the polyvinyl acetate was effected slowly with stirring at room temperature and more rapidly with application of mild heat, e.g., of the order of magnitude of steam bath temperatures. The resulting solutions were flowed on glass plates and the respective solvents allowed to evaporate at room temperature. There were thereby obtained self-supporting films of the polyvinyl acetate exhibiting no noticeable differences in properties from the starting film.

Similarly, the tetrafluorooxaspirononenones of the present invention serve as useful solvents for the same classes of addition polymers as just described above in detail for the dihalotetrafluorooxaspirononenes. More specifically, samples of the same commercially-available polyvinyl acetate readily dissolved in the 2,2,3,3-tetrafluoro-5-oxaspiro[3.5]non-7-ene-1-one of Example VII even at room temperature and could be recovered therefrom by evaporation of the solvent at room temperature.

The hydrate derivatives of the just-described tetrafluorooxaspirononenones, or alternatively phrased the 2,2,3,3 - tetrafluorooxooxaspirononenes, i.e., the tetrafluorodihydroxyoxaspirononenes, being crystalline solids under normal room conditions will not normally be considered for use as solvents. The same applies to the dioxadispirotetradecadienes of the present invention. However, these materials being soluble ethers have other important uses, e.g., as emulsifiers for fats or oils in water or other aqueous media. More specifically, the 2,2,3,3 - tetrafluoro - 1,1 - dihydroxy - 5 - oxaspiro[3.5]-non-7-ene of Example VIII and the 13,13,14,14-tetrafluoro - 3,4,10,11 - tetramethyl-1,8-dioxadispiro[5.0.5.2]-tetradeca-3,10-diene of Example IX will serve to emulsify in a stable emulsion such fats and oils as stearic, myristic, and lauric acids in aqueous systems.

Since obvious modifications in the invention will be evident to those skilled in the chemical arts, I propose to be bound solely by the appended claims.

The embodiments of the invention in which an exclusive property or privilege is claimed or defined as follows:

1. Compounds of the formula

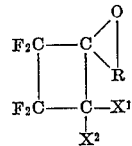

wherein: $X^1$ and $X^2$ are selected from the group consisting of (1) two halogens of atomic number 9–35; (2) two hydroxyl groups; (3) one hydroxyl group and one aliphatically-saturated hydrocarbonoxy group of no more than 8 carbons free from Zerewitinoff active hydrogen; and (4) one doubly-bonded oxygen; and R is the radical

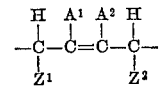

where $Z^1$ and $Z^2$ are selected from the group consisting, respectively, of hydrogen and, jointly, of hydrocarbon radicals of no more than 8 carbons free of Zerewitinoff active hydrogen and $A^1$ and $A^2$ are selected from the group consisting, respectively, of hydrogen and, jointly, of hydrocarbon radicals of no more than 8 carbons free of Zerewitinoff active hydrogen.

2. 1,1,2,2,3,3 - hexafluoro - 5 - oxaspiro[3.5]non - 7-ene, B.P. about 137° C. at atmospheric pressure, $n_D^{25}$ =1.3720.

3. 1,1,2,2,3,3 - hexafluoro - 6,9 - methano - 5 - oxaspiro[3.5]non-7-ene, B.P. about 51° C. at 10 mm. of mercury pressure, $n_D^{25}$=1.3865.

4. 1,4,5 - metheno-cyclopenta(c)tetrahydrofuran - 3-spiro - 1' - 2',3' - 3', 4',4' - hexafluorocyclobutane, B.P. about 88° C. at 18 mm. of mercury pressure, $n_D^{25}$ =1.4901.

5. 1 - bromo - 1,2,2,3,3 - pentafluoro - 7,8 - dimethyl-5-oxaspiro[3.5]non-7-ene, B.P. about 80–81° C. at 8 mm. of mercury pressure.

6. 1,1 - dichloro - 2,2,3,3 - tetrafluoro - 7,8 - dimethyl-5-oxaspiro[3.5]non-7-ene, B.P. about 85–87.5° C. at 7 mm. of mercury pressure.

7. 2,2,3,3 - tetrafluoro - 5 - oxaspiro[3.5]non - 7 - en-1-one, B.P. about 67° C. at 28 mm. of mercury pressure.

8. 2,2,3,3 - tetrafluoro - 1,1 - dihydroxy - 5 - oxaspiro-[3.5]non-7-ene.

9. A compound of the formula

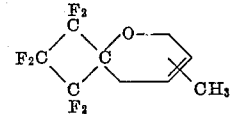

10. The process which comprises reacting, under substantially anhydrous conditions, a member of the group consisting of saturated polyfluoroperhalocyclobutanones and polyfluoroperhalocyclobutane-1,2-diones with a wholly carbon chain 1,3-diene free of Zerewitinoff active hydrogen.

11. The process which comprises reacting, under substantially anhydrous conditions, perfluorocyclobutanone with a wholly carbon chain 1,3-diene free of Zerewitinoff active hydrogen.

12. The process which comprises reacting, under substantially anhydrous conditions, perfluorocyclobutane-1,2-dione with a wholly carbon chain 1,3-diene free of Zerewitinoff active hydrogen.

13. The process which comprises reacting, under substantially anhydrous conditions, perfluorocyclobutanone and butadiene.

14. The process which comprises reacting, under substantially anhydrous conditions, perfluorocyclobutanone and cyclopentadiene.

15. The process which comprises reacting, under substantially anhydrous conditions, perfluorocyclobutanone and bicycloheptadiene.

16. The process which comprises reacting, under substantially anhydrous conditions, perfluorocyclobutanone and isoprene.

No references cited.

UNITED STATES PATENT OFFICE
CERTIFICATE OF CORRECTION

Patent No. 3,036,091            May 22, 1962

David C. England

It is hereby certified that error appears in the above numbered patent requiring correction and that the said Letters Patent should read as corrected below.

Column 14, line 56, for "spiro-1'-2',3'-3',4',4'-" read -- spiro-1'-2',2',3',3',4',4'- --.

Signed and sealed this 2nd day of October 1962.

(SEAL)
Attest:

ERNEST W. SWIDER
Attesting Officer

DAVID L. LADD
Commissioner of Patents